UNITED STATES PATENT OFFICE.

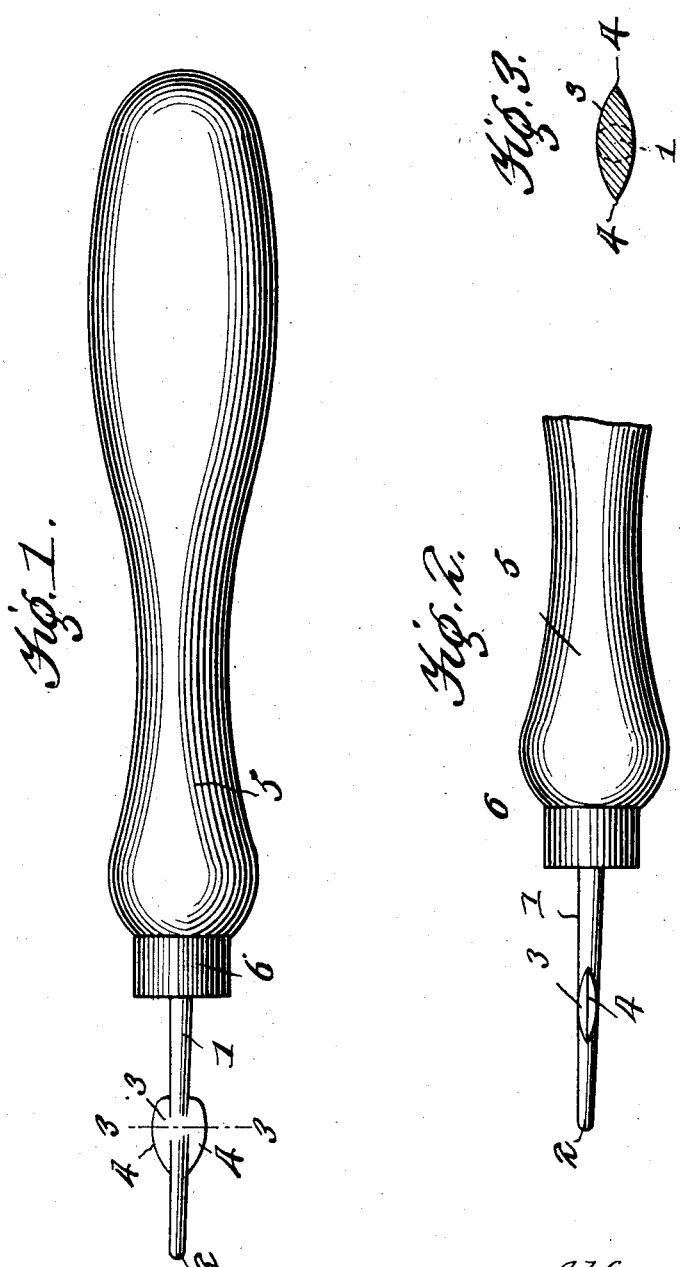

ALFRED C. SMITH, OF MULLEN, NEBRASKA.

LANCET.

1,037,802. Specification of Letters Patent. Patented Sept. 3, 1912.

Application filed September 15, 1909. Serial No. 517,833.

*To all whom it may concern:*

Be it known that I, ALFRED C. SMITH, a citizen of the United States of America, residing at Mullen, in the county of Hooker and State of Nebraska, have invented new and useful Improvements in Lancets, of which the following is a specification.

This invention relates to lancets, and one of the principal objects of the same is to provide a simple, reliable and efficient device for lancing the milk ducts of cows.

It is a well known fact that certain cows are difficult to milk owing to the fact that the milk duct is obstructed either by nature or from other causes. By lancing the milk ducts of such cows this difficulty is obviated.

It is one of the principal objects of my invention to provide a simple and readily available device for lancing the milk ducts of the cow's teats. These and other objects may be attained by means of the construction illustrated in the accompanying drawing, in which,—

Figure 1 is a plan view of a lancet made in accordance with my invention. Fig. 2 is a side elevation of the same, a portion of the handle being broken away. Fig. 3 is a detail sectional view taken on the line 3—3 of Fig. 1.

Referring to the drawing the numeral 1 designates the shank of the lancet, which is preferably made of a cross sectionally rounded tapering solid steel rod having a rounded edge 2 and being integrally formed a distance away from its edge with diametrically opposite cutting members 3. By reference to Figs. 2 and 3 of the drawings, it will be noted that the integrally formed cutting members 3 are centrally of a width equaling the thickness of the rod 1 and that their cutting edge 4 is arranged longitudinally central of the rod or shank 1. The cutting edge, as illustrated in Fig. 1 of the drawing is curved in plan and the shank 1 is secured within a suitable handle 5 provided with a ferrule 6. The cutting members have their cutting edges substantially elliptical. The said cutting edges arising gracefully from their connection with the shank adjacent the entering end 2 and terminate somewhat abruptly at their connection with the shank adjacent the handle for the shank. The cutting edge is arranged central of each of the members and by reference to Fig. 2 of the drawings it will be noted that the sides are curved, or are of an arcuate formation from the juncture of the opposite edges of the cutting elements, thus the said cutting elements are of a greater thickness in their centers than at any other point and the said centers are arranged flush with the shank.

In use, the rounded end 1 is inserted within the lower duct of the teat and is pushed upward until the sharp edges 4 cut the obstruction in the duct. The peculiar shape of the cutting members will allow the same to perform their functions without unnecessary pain to the animal, the rounded sides forcing the obstruction toward each side of the duct to provide a clear passage therein.

My device is of simple construction and is easy to use. The edges 4 may be readily sharpened whenever they become dull without the use of special tools. It will be further noted that by constructing the cutting members 3 as above described the obstruction within the milk duct will be cut by the sharpened edges 4 of the members 3 and that the said construction will be effectively opened by the thickened portion of the cutting members 3, so as to effectively provide for the free passage of the milk.

I claim:—

The herein described construction of lancets, comprising a shank which is rounded in cross section, and which is flared toward its outer reduced and rounded end, cutting elements integrally formed upon the shank and arranged directly opposite each other upon the opposite sides of the shank and at a distance from the rounded end of the shank, the said cutting elements being substantially elliptical and terminating in cutting edges central of the major axis thereof, the said cutting elements having their cutting edges curved upwardly and gradually from their juncture with the shank and adjacent the rounded end thereof, the rear portions of the edges of the said cutting elements being rounded abruptly to their juncture with the shank, and each of the said cutting elements providing a body which is substantially elliptical at its longitudinal juncture with the shank.

In testimony whereof I affix my signature in presence of two witnesses.

ALFRED C. SMITH.

Witnesses:
W. H. GARRETT,
H. L. PIERCE.

Copies of this patent may be obtained for five cents each, by addressing the "Commissioner of Patents, Washington, D. C."